Figure 1:
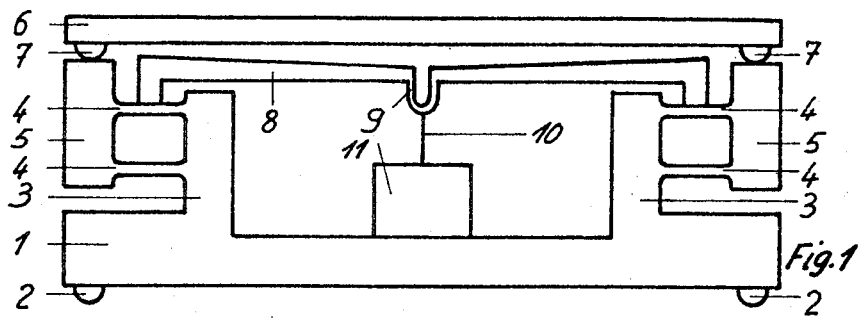

United States Patent [19]

Wirth et al.

[11] 4,453,608

[45] Jun. 12, 1984

[54] MASS AND FORCE METER

[75] Inventors: Johannes Wirth; Mario Gallo, both of Zürich; Kaspar Saner, Dübendorf, all of Switzerland

[73] Assignee: Wirth Gallo & Co., Zurich, Switzerland

[21] Appl. No.: 394,308

[22] Filed: Jul. 1, 1982

[30] Foreign Application Priority Data

Aug. 1, 1981 [EP] European Pat. Off. ........ 81106049.0

[51] Int. Cl.³ .......................... G01G 3/12; G01G 3/16; G01G 3/00; G01G 3/14
[52] U.S. Cl. .............................. 177/210 FP; 177/229; 73/862.59; 73/DIG. 1
[58] Field of Search ................. 177/134, 229, 210 FP; 73/862.59, 862.62, 862.64, DIG. 1

[56] References Cited

U.S. PATENT DOCUMENTS 3,877,532 4/1975 Hale ..................................... 177/229
4,072,202 2/1978 Storace ................................ 177/229
4,343,196 8/1982 Wirth et al. ....................... 73/862.62

FOREIGN PATENT DOCUMENTS 16238 10/1980 European Pat. Off. .
2710788 9/1978 Fed. Rep. of Germany .
2112216 7/1971 France .

Primary Examiner—Joseph W. Hartary
Assistant Examiner—Patrick W. Foster
Attorney, Agent, or Firm—Parkhurst & Oliff

[57] ABSTRACT

A mass and force meter particularly suited for weighing large and bulky loads, for example vehicles, which, in spite of the large dimensions of the load support due to the nature of the load, has a small total height and in which possible unpredictable deformations of the frame do not influence the precision of the measurement, said mass and force meter having a frame, a load support directly supported by two brackets each of which is connected to the frame by means of two flat springs forming a parallel guiding device, a measuring system, springs compensating the main share of the load and an elastic transmission element transmitting to the measuring system the load-proportional remaining share of the load.

5 Claims, 19 Drawing Figures

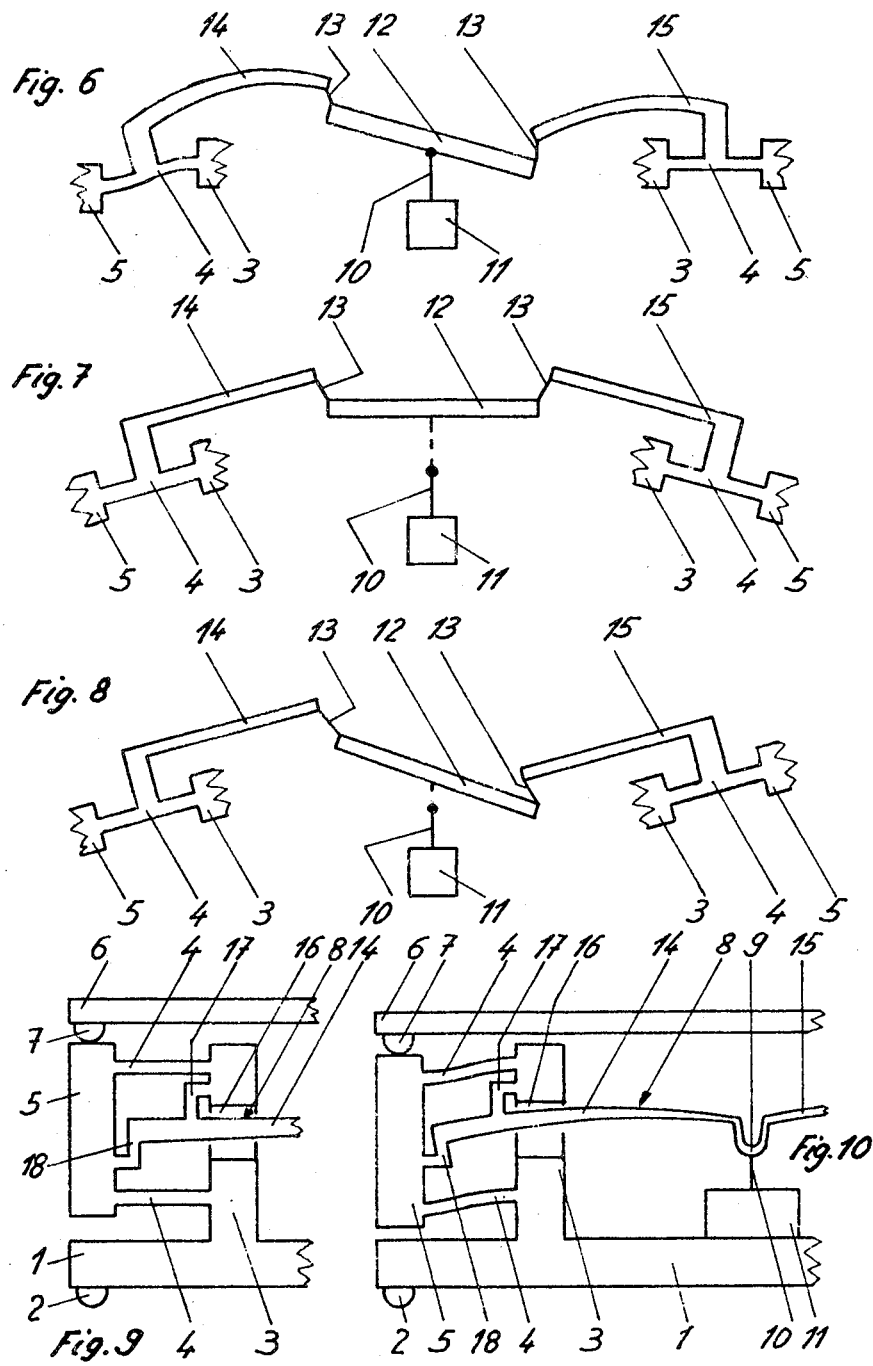

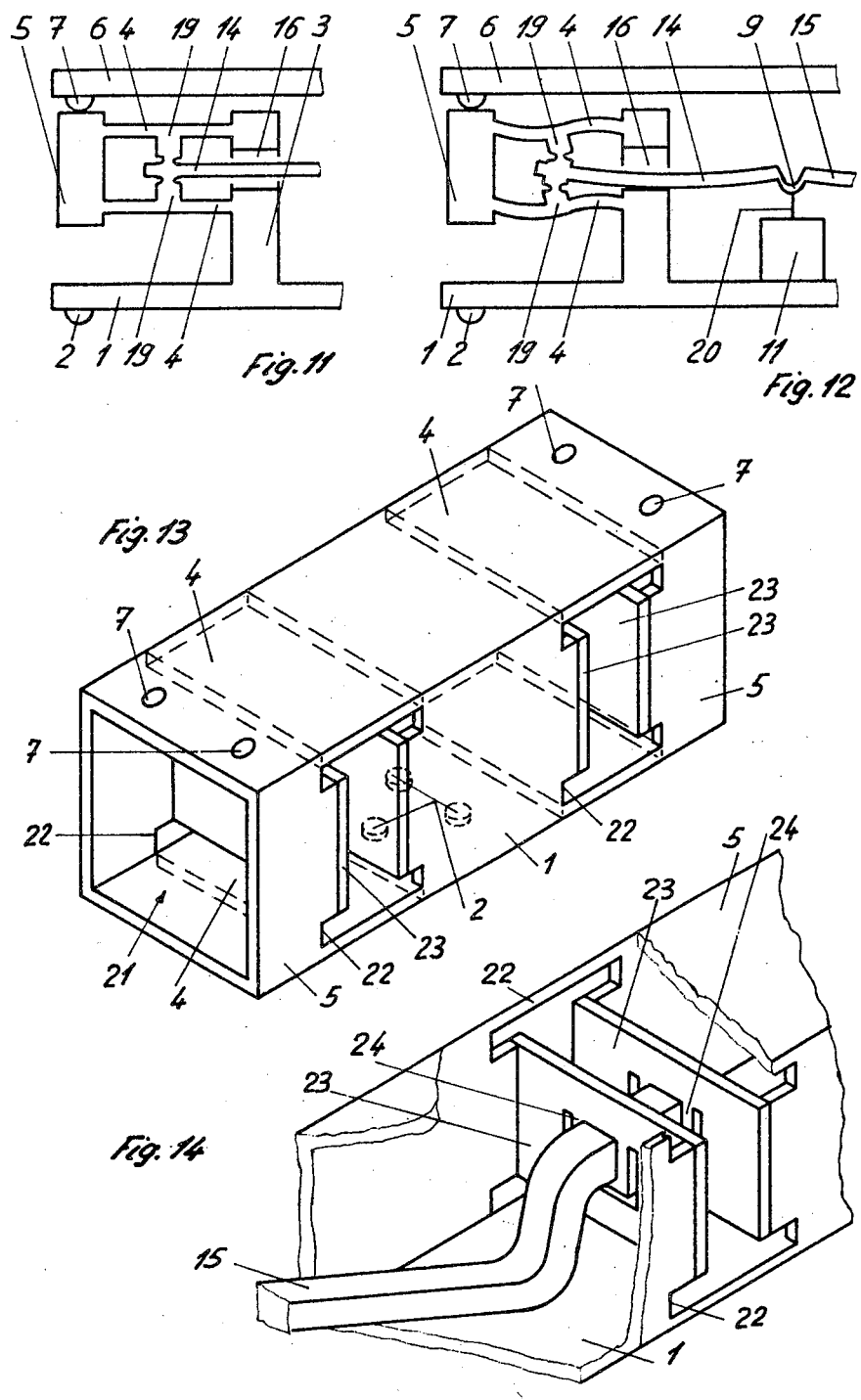

MASS AND FORCE METER

The invention relates to a mass and force meter particularly suited for weighing large and bulky loads, for example vehicles. This mass and force meter has a frame, a load support, a measuring system, springs compensating the main share of the load and an elastic transmission element transmitting to the measuring system the load-proportional remaining share of the load.

Mass and force meters of this type are known, for instance from European Patent Appln. 78101647.2, in which a load spring is mounted between the load support, which is guided parallely, and a frame, a substantially weaker spring, being mounted between the load support and the measuring system which transmits to the latter a small measuring force which is proportional to the total load to be measured.

In European Patent Application 79100900.Y another meter is described in which the load spring is constructively combined with the elements guiding the load support parallely to form a single element of the meter. In both types of known meters the load support is guided parallely by means of guides. In all types of parallel guiding by means of such guides the maximum possible bending stress of the guides in longitudinal direction increases with the dimensions of the load support and decreases with vertical distance between the guides. In order to build mass meters with large dimensions it is therefore required to use either very massively built guides or ones which must then be at a certain vertical distance from each other. In both cases the total height of the meter is relatively large. If large and bulky loads like vehicles or locomotives must be weighed and if the meter must be mounted in a flat pit, it is not possible to use the known meters for the reasons stated above. Furthermore, there is an additional difficulty. With the known meters the absolute value of the maximum allowable load is so limited that it is possible to assume that the frame of the meter is absolutely rigid, which is compulsory for error-free measurement. In order to be able to make the same assumption for meters intended for large loads, the frame should be so heavy and massive that the requirements of a relatively small height as well as that of a reasonable production cost would not be satisfied.

It is an object of the invention to provide a mass and force meter which, in spite of the large dimensions of the load support due to the nature of the load, has a small total height and in which possible unpredictable deformations of the frame do not infuence the precision of the measurement.

According to the invention a mass and force meter of the type mentioned above has a load support directly supported by two brackets each of which is connected to the frame by means of two flat springs forming a parallel guiding device.

Embodiments of the invention are represented schematically in the enclosed drawings.

Figure 2:
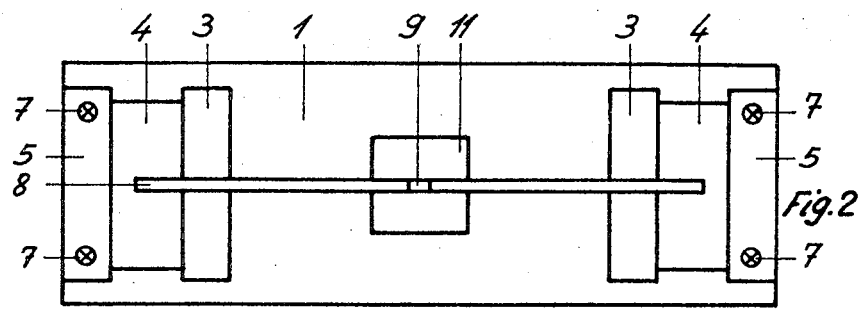
Figure 3:
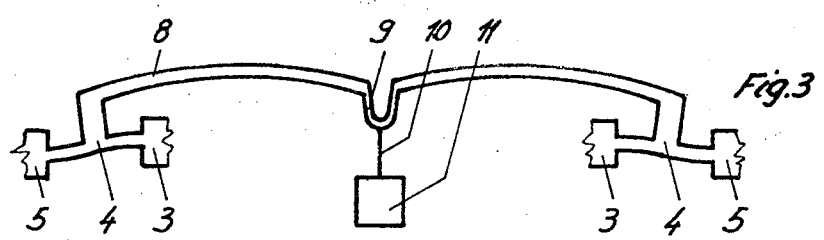
Figure 4:
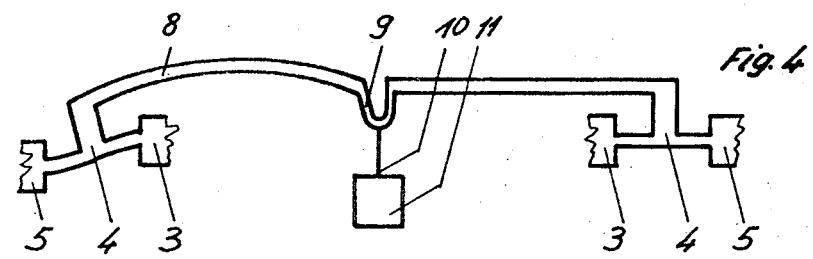
Figure 5:
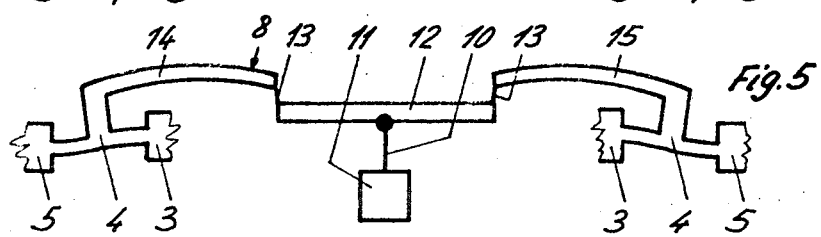
Figure 15:
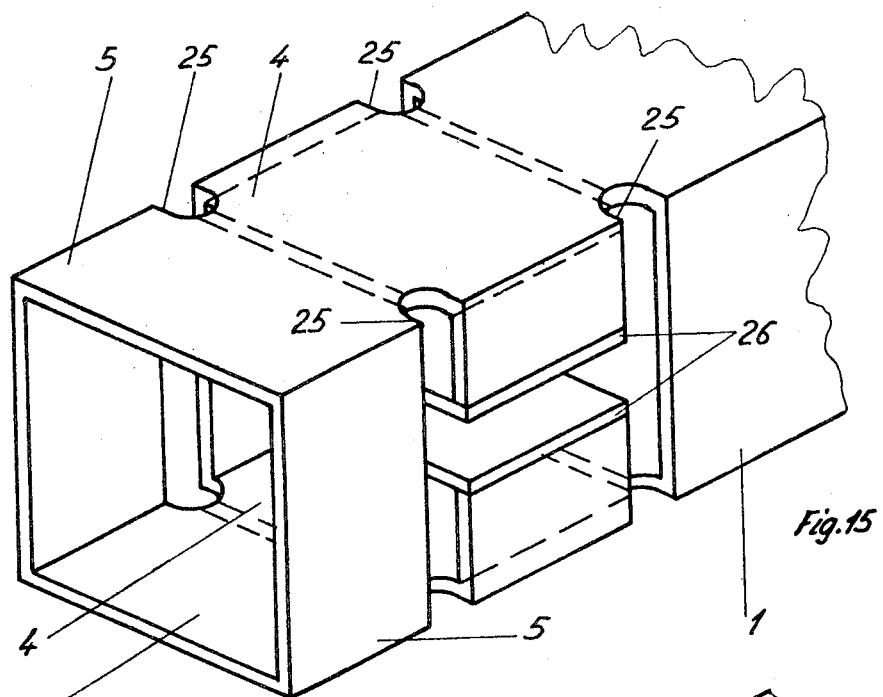
Figure 16:
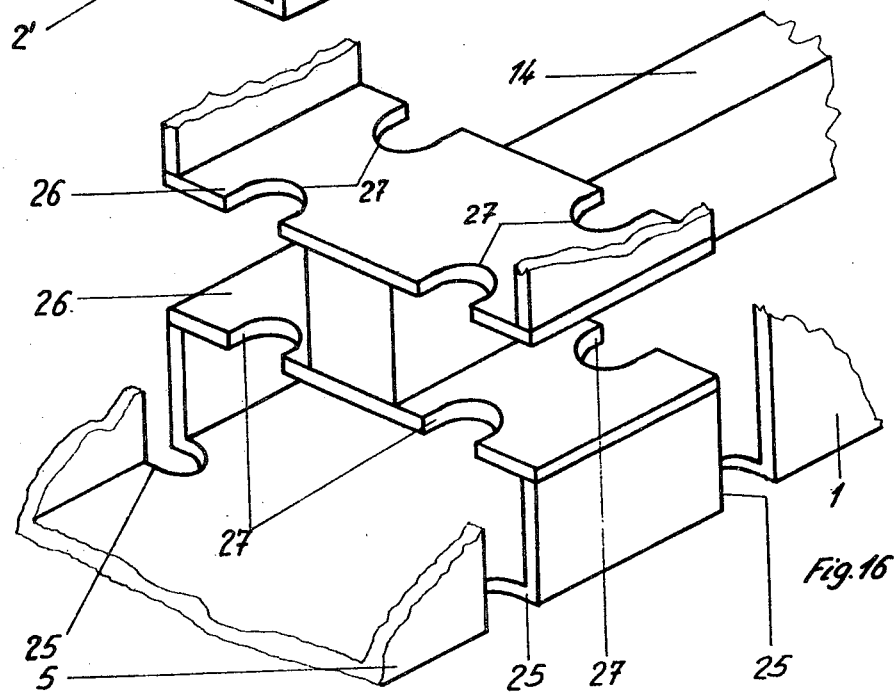
Figure 17:
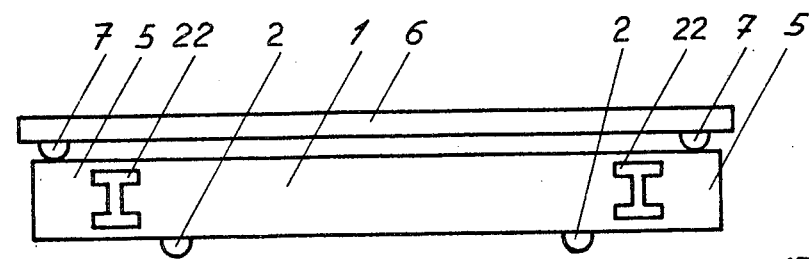
Figure 18:
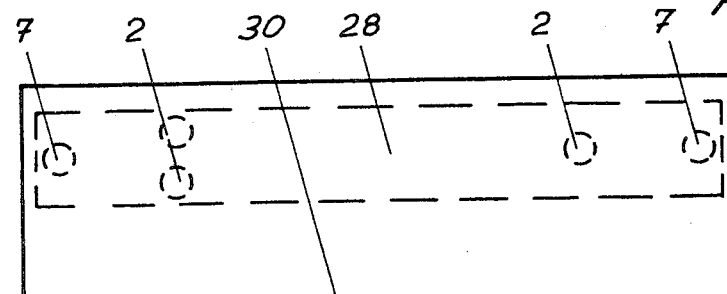
Figure 19:
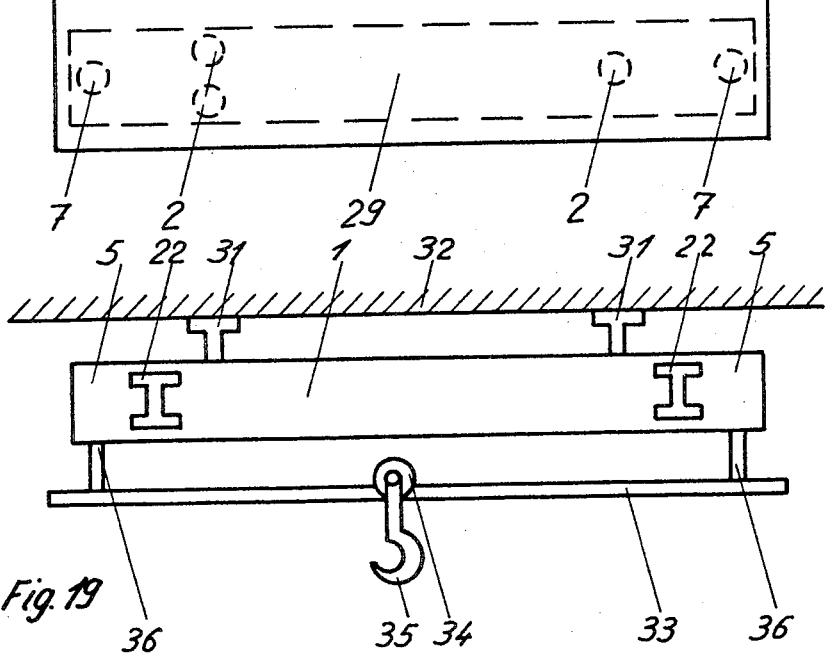

FIG. 1 is a view in elevation of a first embodiment,
FIG. 2 is a view from above without load support,
FIGS. 3,4 show the deformation of the transmission element for various loads,
FIGS. 5-8 show a variant of the transmission element,
FIGS. 9-10 show a second embodiment,
FIGS. 11-12 show a third embodiment,
FIGS. 13-14 show a fourth embodiment,
FIGS. 15-16 show a fifth embodiment,
FIGS. 17-19 show applications of the embodiment of FIGS. 13-14.

A first embodiment is shown schematically in FIGS. 1-4. The mass meter shown has a lengthy frame 1 supported on the left-hand side by one foot 2 and on the right-hand side by two feet 2. It has two vertical arms 3. In each of these arms 3 a pair of flat springs 4, mounted one above the other, is fitted. Their other ends are fitted into a bracket 5. A load support 6 is mounted above these brackets 5. On its lower side it has four load points 7 directly resting on brackets 5. An elastic transmission element 8 consisting of flexible springs is fitted at each end in the upper flat spring 4. In its middle it has a U-shaped, elastic part 9 connected by means of a traction wire 10 with the force input of a load cell 11 fixed to frame 1. Part 9 is substantially more flexible than the springs forming transmission element 8.

When load support 6 is loaded, the main share of the load is compensated by springs 4. The remainder of the load, which is proportional to the total load itself, is transmitted by transmission element 8 and wire 10 to load cell 11.

When the load is centred on load support 6 (FIG. 3) both springs forming transmission element 8 are equally flexed for symmetry reasons, their ends fitted into flat springs 4 are shifted downwards by the same amount. The rotation of these ends are equal but of inverse sense. As the position of part 9 relatively to frame 1 is fixed by means of wire 10 and load cell 11 an upwards directed force is generated which acts on wire 10, this so-called measuring force is transmitted to, and computed by, load cell 11 in order to assess the magnitude of the load. This measuring force corresponds to a fraction only of the total load, for instance 1%.

If the load is not centred on load support 6, if it acts for instance on its left side only, only the left spring forming transmission element 8 is flexed (FIG. 4). The measuring force generated thereby acts on wire 10 and is proportional to the load.

In FIGS. 5-8 a variant of transmission element 8 is schematically represented. Instead of part 9, transmission element 8 has in its middle a rigid rod 12 connected by means of elastic articulations with two springs 14, 15 FIG. 5 corresponds to the case of a load centred on load support 6. In its middle rod 12 is connected with wire 10. As in the case of FIG. 3 both springs 14, 15 are equally flexed for symmetry reasons. FIG. 6 corresponds to a load not centred on load support 6 as in the case of FIG. 4. In this case of a load acting in non-symmetrical way, rod 12 rotates until balance of forces is achieved, i.e. until both springs 14, 15 are equally flexed and so exert each the same force on rod 12. This force is equal to half the force spring 14 would exert if rod 12 would remain horizontal and spring 15 unloaded.

In all cases of FIGS. 3-6 the implicit assumption is made that frame 1 is rigid enough with regard to the magnitude of the load so as not to be subjected to unpredictable deformations which would corrumpt the measurement of the load. If this is not the case and if arms 3 are slightly deformed under the action of the load, this causes an additional flexure of transmission element 8 superimposed to its deformation as described above. This can be the case when load points 7 are not located vertically above feet 2 so that frame 1 is subjected to moments. These additional deformations are shown in FIGS. 7 and 8. FIG. 7 shows the deformation superimposed on that of FIG. 5 when two equal moments of inverse sense act on frame 1. The ends of springs 14, 15 fitted in flat springs 4 are shifted, springs 14, 15 are rotated so that rod 12 is virtually shifted vertically with respect to load cell 11. By selecting correctly the length of springs 14, 15 the virtual shift of their ends is made equal to the virtual shift of rod 12. As a consequence the meter remains insensitive to these deformations of frame 1. In FIG. 8 the case is represented in which two equal moments of same sense act on frame 1. The ends of springs 14, 15 are shifted and rotated by the same amount. Rod 12 is shifted and rotated. By selecting correctly the length of springs 14, 15 it is possible also in this case to avoid an additional load which would corrupt the correct measurement. In this case the meter remains insensitive to these deformations of frame 1.

In FIGS. 9 and 10 a second embodiment is schematically represented. Arms 3 present a hole 16 through which the ends of transmission element 8 extend. These ends are connected by means of two bands 17, 18 with arm 3 and bracket 5, said bands 17, 18 being mounted so as to be horizontally shifted from each other. When springs 4 are flexed under the action of the load transmission element 8 undergoes a deformation (FIG. 10). The traction force thus generated in wire 10 is the measuring force transmitted to load cell 11 for assessment of the magnitude of the load.

In FIGS. 11-12 a third embodiment is represented. The ends of transmission element 8 are connected to springs 4 by means of two elastic articulations 19 mounted one above the other. When the load acts upon springs 4 (FIG. 12) transmission element 8 is flexed upwards. Part 9 exerts a pressure force on a small, rigid rod 20 acting upon the force input of load cell 11. This pressure force is the measuring force.

In FIGS. 13 and 14 a fourth embodiment is schematically represented which corresponds to an actual realization of the embodiment according to FIGS. 9 and 10. In these FIGS. 13, 14 load support 6 is not represented. All other parts are formed by a single tube 21 of rectangular or square section. All parts described below are symmetrical with respect to a middle vertical plane with the exception of feet 2.

In tube 21 four double-T-shaped openings 22 have been milled. The middle part of tube 21 forms frame 1 of the meter, brackets 5 are formed by the ends of tube 21. Frame 1 and brackets 5 are linked to each other by means of four flexible parts forming springs 4. Rigid plates 23 are fixed along the vertical edges of openings 22. Each of these plates 23 has a C-shaped groove 24. In the tongue so formed one end of spring 14 (or 15) is fixed, the other end of which is fixed as shown in FIGS. 4–8 by means of articulations 13 (not represented) with a rigid rod 12 (not represented).

In FIGS. 15, 16 a further embodiment is represented which corresponds to an actual realization of the embodiment according to FIGS. 11 and 12. Instead of double-T-shaped openings tube 21 has H-shaped openings 25. Plates 26 are fixed along the horizontal edges of openings 25. These plates 26 present cut-offs 27 so as to form an elastic articulation. The end of spring 14 (or 15) is fitted between plates 26.

FIGS. 17, 18 show an application of the embodiment according to FIGS. 13, 14 in which two such meters 28, 29 are used with one single common load support 30.

FIG. 19 shows a further application of the embodiment according to FIGS. 13, 14 as suspended scale. Frame 1 is fixed to a ceiling 32 by means of brackets 31. The load support is formed by a rail 33 with roll 34 and load hook 35, which rail 33 is fixed by means of holders 36 to brackets 5 formed by the ends of the frame of the scale.

We claim:

1. In a mass and force meter, a frame, a load support with load points on its lower side, a measuring system, four flat springs mounted pairwise one above the other and having each one end fitted to said frame, two brackets, the other ends of said flat springs being fitted into said brackets so as to guide them parallely, said load points resting directly on said brackets, a flexible transmission element connected in its middle to said measuring system, said flexible transmission element consisting of two springs linked to each other by means of flexible articulations to a rigid rod, said springs having their ends fitted into said flat springs, said flat springs compensating the main share of the load, said flexible transmission element transmitting to said measuring system the remaining load-proportional share of the load.

2. In a mass and force meter, a frame, a load support with load points on its lower side, a measuring system, four flat springs mounted pairwise one above the other and having each one end fitted to said frame, two brackets, the other ends of said flat springs being fitted into said brackets so as to guide them parallely, said load points resting directly on said brackets, a flexible transmission element connected to said measuring system, said flexible transmission element having its ends connected to said flat springs by means of flexible articulations, said flat springs compensating the main share of the load, said flexible transmission element transmitting to said measuring system the remaining load-proportional share of the load.

3. In a mass and force meter, a frame, a load support with load points on its lower side, a measuring system, four flat springs mounted pairwise one above the other and having each one end fitted to said frame, two brackets, the other ends of said flat springs being fitted into said brackets so as to guide them parallely, said load points resting directly on said brackets, a flexible transmission element connected to said measuring system, said flexible transmission element having its ends connected to said frame and to said brackets by means of bands, said flat springs compensating the main share of the load, said flexible transmission element transmitting to said measuring system the remaining load-proportional share of the load.

4. In a mass and force meter, a frame, a load support with load points on its lower side, a measuring system, four flat springs mounted pairwise one above the other and having each one end fitted to said frame, two brackets, said frame and said brackets being formed by a single tube of square section having two double-T-shape openings on each side, said openings having vertical edges, plates fixed along said vertical edges, the other ends of said flat springs being fitted into said brackets so as to guide them parallely, said load points resting directly on said brackets, a flexible transmission element consisting of two springs and connected in its middle to said measuring system, said two springs having one of their ends fitted into said plates said flat springs compensating the main share of the load, said flexible transmission element transmitting to said measuring system the remaining load-proportional share of the load.

5. In a mass and force meter, a frame, a load support with load points on its lower side, a measuring system, four flat springs mounted pairwise one above the other and having each one end fitted to said frame, two brackets, said frame and said brackets being formed by a single tube of square section having two H-shaped openings on each side, said openings having horizontal edges, plates fixed along said horizontal edges, cut-offs in said horizontal plates, the other ends of said flat springs being fitted into said brackets so as to guide them parallely, said load points resting directly on said brackets, a flexible transmission element consisting of two springs and connected in its middle to said measuring system, said two springs having one of their ends fitted between said horizontal plates, said flat springs compensating the main share of the load, said flexible transmission element transmitting to said measuring system the remaining load-proportional share of the load.

* * * * *